May 16, 1961 C. E. QUINBY 2,984,251
PRESSURE REGULATOR
Filed Dec. 23, 1957
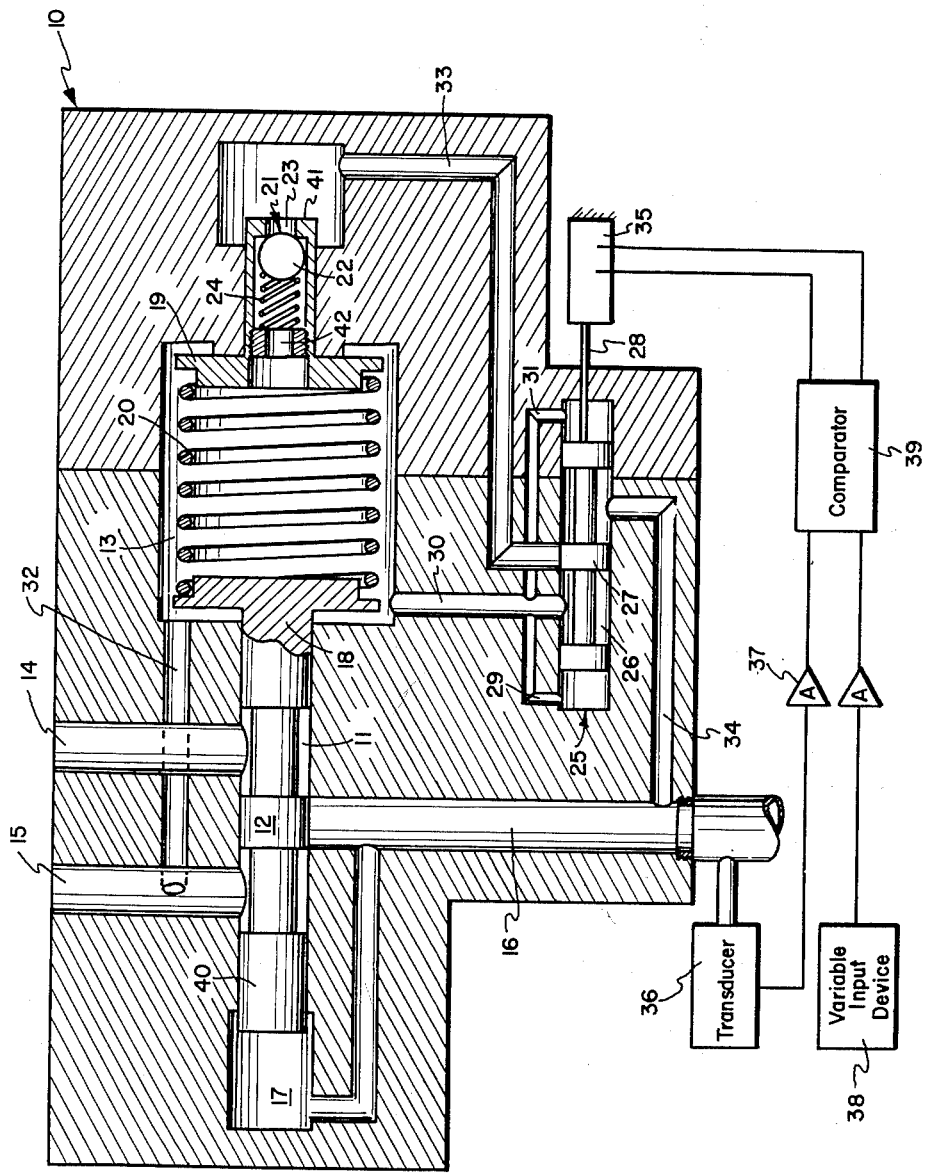
INVENTOR.
CHARLES E. QUINBY
BY Harold J. Downes
ATTORNEY ial application of this invention is not limited to the

United States Patent Office 2,984,251
Patented May 16, 1961

2,984,251

PRESSURE REGULATOR

Charles E. Quinby, Grand Rapids, Mich., assignor to Lear, Incorporated

Filed Dec. 23, 1957, Ser. No. 704,747

1 Claim. (Cl. 137—116.3)

This invention relates to pressure regulators and, more particularly, to a fluid pressure regulator having a variable demand pressure.

In the past, fluid regulators have been constructed for providing fluid under constant regulated pressure; however, these regulators did not have an automatic, built-in control for regulating the fluid flow or pressure in the demand line as called for by a constant and/or changing input signal.

Therefore, it is an object of this invention to provide a fluid pressure regulator having a control means therein to regulate automatically fluid pressure of fluid flowing therethrough in accordance with a varying electrical signal.

Another object of this invention is to provide a variable demand fluid pressure regulator wherein the controlled pressure of the fluid is a function of a variable, such as velocity or load.

It is also an object of this invention to provide a variable demand fluid pressure regulator which automatically varies the controlled pressure of the fluid as the demand varies and to provide a built-in safety element which limits pressure build-up to a predetermined maximum.

Still another object of this invention is to provide a variable demand fluid pressure regulator that automatically corrects for an error resulting from fatigue, wear or malfunction.

A preferred embodiment of the invention is illustrated in the drawing for the purpose of exemplification and not of limitation since it is understood that various modifications may be made in the exact arrangement of parts without departing from the spirit and scope of the invention.

Referring to the drawing, there is illustrated a housing 10 provided with a first cylinder 11 containing a valve member 12 which is reciprocally movable therein and with spaced passages or ports hereinafter referred to as a supply port 14, a return port 15 and a demand port 16. The supply and return ports are axially spaced along the cylinder 11 and the demand port is located between the supply and return ports.

One end of the cylinder 11 merges with a cylinder 13 and the other end of the cylinder 11 is provided with a port 17 connected by suitable conduit or fluid passage to the demand port 16.

Mounted within the second cylinder 13 are coaxially aligned pistons 18 and 19 placed back-to-back and separated by a resilient means, such as coiled spring 20, with one of these pistons 18 extending into the cylinder 11 to engage and move the valve member 12 and the other piston 19 being provided with a check valve 21. The check valve 21 has a ball 22 urged against the orifice 23 by a spring 24.

The invention further includes a control valve 25 within housing 10, comprising a control valve cylinder 26, a control valve member 27, reciprocally movable in cylinder 26, having an operating rod 28 extending out of the valve housing. Spaced axially along the control valve cylinder 27 are return ports 29, 30 and 31 with port 30 located between ports 29 and 31 and all three return ports being connected to the return port 15 by way of cylinder 13 and suitable conduit 32. The cylinder 26 also has a control fluid pressure port 33 spaced between return ports 30 and 31. An extension 34 of the demand port 16 is located between the control port 33 and return port 31 in the cylinder 26.

The structure of the preferred embodiment, as illustrated, is completed by providing an electromagnetic actuator 35 for operating the valve member 27 and a transducer 36 responsive to pressure in the demand port 16 for operating and controlling the actuator 35. In this instance, it has been found advisable to use a transducer capable of forming electrical signals in response to pressure changes. These electrical signals may be amplified by a suitable amplifier 37 to control the actuator 35 if amplification of the signal is needed.

Further, in some instances it may be desired to operate the actuator 35 in response to a combination of signals from the pressure transducer 36 and variable input device 38, such as an accelerometer. In such cases, the signals from the variable input device 38 and the signals from the pressure transducer 36 are compared by suitable electrical means herein referred to as a comparator 39. Any variance, as determined by the comparator 39, of the two signals from a predetermined relationship indicates the fluid pressure in the demand port 16 to be undesirable and an electrical signal from the comparator 39 is transmitted to the actuator 35 by suitable electrical wiring.

The operation of the herein described embodiment will now be described by referring to the drawing which shows the parts positioned in the stable operating position by the pressures of the fluid in the ports and supply lines and as called for by the signals. In this instance, the drawing shows the stable operating position as that position attained by the parts when there is no demand of fluid or change of pressure on the demand port.

When a demand is placed on the regulated fluid pressure port 16, the fluid pressure acting upon the end 40 of valve member 12, protruding into demand port 17, reduces thereby causing the spring 20 to move the valve member 12 in a position such that fluid may flow from the high pressure supply port 14 to the regulated pressure port 16. When the pressure in the regulated port 16 and against the end 40 of valve member 12 is sufficient to move valve member 12 against the spring 20, the valve member 12 reaches a position such that the leakage of fluid from high pressure port 14 to regulated pressure port 16 equals the leakage of fluid from regulated pressure port 16 to return port 15. This causes the pressure in port 16 to remain constant. If, however, the pressure in regulated pressure port 16 is too high, the pressure in port 16 and against end 40 of valve member 12 will move valve member 12 into a position such that the fluid in port 16 can flow into the return low pressure port 15 thereby reducing the fluid pressure in port 16. At all times, the variable input signal from the variable input device 38 is compared with the pressure sensed signal from the transducer 36 by the comparator 39. An electrical signal proportional to the variance from a predetermined relationship of the two signals transmitted to the comparator 39 by the transducer 36 and variable input device 38 is received by the actuator 35 from the comparator 39. If the difference in the two signals indicates that a higher regulated pressure in port 16 is required, then the actuator 35 will move the valve member 27 in such a manner that fluid pressure will flow from the regulated pressure port 34 into the control port 33. The fluid pressure will now act upon the end 41 of piston 19 thereby causing spring 20 to be compressed which in turn will exert more force on the valve member 12 causing the valve member 12 to move into a position which will allow fluid flow from high pressure port 14 to regulated pressure port 16. If, however, the signals entering the comparator 39 indicate that the pressure in port 16 is too high, the actuator 35 will move valve member 27 in such a manner as to allow fluid flow from control port 33 to return port 30 thereby causing the pressure on the surface 41 of piston 19 to be reduced and cause the spring 20 to be elongated which would reduce the force on valve member 12 causing valve member 12 to move into a position which would allow fluid flow form regulated pressure port 16 to return port 15. If valve member 27 were in the position to allow fluid flow from regulated pressure port 34 to control port 33 and the regulated pressure were at its predetermined maximum, the spring backed ball check valve would act as a safety device such that the pressure on the ball forces the ball away from the orifice 23 causing the fluid in control port 33 to flow to the low pressure or return port 15 by way of suitable passage 42 in the piston 19, cylinder 13 and port 32 thereby limiting the maximum pressure the system will allow to build up. It is to be noted that the pressure ranges of the system are directly dependent upon the springs 20 and 24.

Although the present invention has been described with a certain degree of particularity, it is understood that various modifications in the details and arrangements of parts may be had without departing from the spirit and scope of the invention as hereinafter claimed.

I claim:

A fluid pressure regulator for delivering continuously pumped fluid under variable pressure whereby said pressure is varied in accordance with a variable electrical signal, comprising a housing, a cylinder within said housing having a high pressure inlet port, a regulated pressure outlet port, a low pressure return port, a spool valve member reciprocally movable in said cylinder controlling flow of fluid from said inlet port to said outlet port and from said outlet port to said return port, conduit means connected to said outlet port and one end of said valve member such that one end of said valve member protrudes into said conduit means causing fluid pressure in said outlet port to be transmitted to and against one end of said valve member to urge the same in a direction that causes said valve member to restrict flow of fluid from said inlet port to said outlet port, a spring urging said first valve member in an opposite direction and in opposition to urging of said pressure in said outlet port in such a manner as to cause the valve member to allow fluid flow from said inlet port to said outlet port, a control fluid port operably connected to said spring such that fluid pressure in said controlling port compresses or elongates said spring thereby varying the force exerted by said spring on said first valve member, suitable conduit means connecting said control port to said return port and means for gating said control port from said return port, a second valve member controlling flow of fluid from said regulated port to said control port and from said control port to said return port, said second valve member being operated by a signal generator comprising two transducers, the first of said transducers being connected and responsive to fluid pressure in said regulated pressure port and second of said transducers being connected to and responsive to a variable input electrical signal.

References Cited in the file of this patent
UNITED STATES PATENTS

| | | |
|---|---|---|
| 2,420,394 | Gilman | May 13, 1947 |
| 2,770,251 | Goddard et al. | Nov. 13, 1956 |
| 2,793,620 | Borngesser | May 28, 1957 |
| 2,808,068 | Thomas | Oct. 1, 1957 |
| 2,881,792 | Spence | Apr. 14, 1959 |